(12) United States Patent
Sclafani

(10) Patent No.: US 10,637,135 B2
(45) Date of Patent: Apr. 28, 2020

(54) AIRCRAFT RADOME APPARATUSES AND METHODS

(71) Applicant: The Boeing Company, Chicago, IL (US)

(72) Inventor: Anthony Joseph Sclafani, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 327 days.

(21) Appl. No.: 15/590,271

(22) Filed: May 9, 2017

(65) Prior Publication Data

US 2018/0331424 A1    Nov. 15, 2018

(51) Int. Cl.
*H01Q 1/42* (2006.01)
*B64C 1/36* (2006.01)
*H01Q 1/28* (2006.01)
*B29L 31/34* (2006.01)

(52) U.S. Cl.
CPC ............. *H01Q 1/421* (2013.01); *B64C 1/36* (2013.01); *H01Q 1/28* (2013.01); *B29L 2031/3456* (2013.01)

(58) Field of Classification Search
CPC .......... H01Q 1/421; H01Q 1/42; H01Q 1/286; B64C 1/36; B64C 1/28; B64C 1/42
See application file for complete search history.

(56) References Cited

U.S. PATENT DOCUMENTS

| | | | | |
|---|---|---|---|---|
| 2,998,947 A * | 9/1961 | Griffith | ................... | B64C 30/00 244/117 R |
| 4,736,913 A * | 4/1988 | Bennett | ................... | B64C 21/04 244/119 |
| 5,678,171 A * | 10/1997 | Toyama | ................... | H01Q 1/28 725/76 |
| 5,992,797 A * | 11/1999 | Seidel | ...................... | B64C 1/00 244/118.5 |
| 6,149,101 A * | 11/2000 | Tracy | ....................... | B64C 3/14 244/130 |
| 6,478,253 B1 * | 11/2002 | Seidel | ...................... | B64C 1/00 244/118.1 |

(Continued)

OTHER PUBLICATIONS

European Patent Office, "Extended European search report," issued in connection with European Patent Application No. 18162034.5, dated May 11, 2018, 10 pages.

(Continued)

*Primary Examiner* — Magdalena Topolski
*Assistant Examiner* — Marisa V Conlon
(74) *Attorney, Agent, or Firm* — Hanley, Flight & Zimmerman, LLC

(57) ABSTRACT

Aircraft radome apparatuses and methods are described. In some examples, a radome is to be mounted on an aircraft. In some examples, the radome includes an outer mold line having a closure angle. In some examples, the closure angle is configured to reduce a footprint of the radome. In some examples, the closure angle is also configured to reduce a likelihood of separated airflow from occurring proximate a trailing portion of the radome during a flight of the aircraft. In some examples, the radome is to be mounted on the aircraft at a location that reduces a rate of change of a transverse cross-sectional area of the aircraft.

17 Claims, 9 Drawing Sheets

(56) References Cited

U.S. PATENT DOCUMENTS

| | | | |
|---|---|---|---|
| 6,661,388 B2* | 12/2003 | Desargant | H01Q 1/28 343/705 |
| 6,844,855 B2* | 1/2005 | Carson | H01Q 21/00 343/705 |
| 6,856,295 B2* | 2/2005 | Desargant | H01Q 1/28 343/705 |
| 6,857,598 B2* | 2/2005 | Adamson | B64C 1/0009 244/119 |
| 7,311,287 B2 | 12/2007 | Morgenstern et al. | |
| 7,429,958 B2* | 9/2008 | Lindackers | H01Q 1/1214 343/713 |
| 7,967,252 B2* | 6/2011 | Ferguson | B64C 7/00 244/121 |
| 7,967,253 B2* | 6/2011 | Ferguson | B64C 1/36 244/121 |
| 8,783,617 B2* | 7/2014 | Harbeck | B64C 1/0009 244/13 |
| 8,979,018 B2 | 3/2015 | Pflug et al. | |
| 9,531,064 B2* | 12/2016 | Keen | H01Q 1/28 |
| 9,608,321 B2* | 3/2017 | Cordone | H01Q 1/42 |
| 9,761,939 B2* | 9/2017 | Pietila | H01Q 3/24 |
| 10,059,426 B2* | 8/2018 | Flores | B64C 7/00 |
| 10,131,445 B2* | 11/2018 | Ferguson | B64D 45/00 |
| 10,315,756 B2* | 6/2019 | Grip | B64C 25/32 |
| 2006/0038063 A1* | 2/2006 | Graham | B64C 30/00 244/35 A |
| 2014/0111390 A1* | 4/2014 | Carides | H01Q 1/2216 343/705 |
| 2014/0225768 A1 | 8/2014 | Engel et al. | |
| 2016/0172748 A1 | 6/2016 | Keen et al. | |
| 2017/0331176 A1* | 11/2017 | Levy | H01Q 1/28 |

OTHER PUBLICATIONS

Northrop Grumman, "Northrop Grumman RQ-4 Nato AGS UAV Nato Alliance Ground Surveillance Unmanned Air Vehicle," retrieved from [https://web.archive.org/web/20151122232318/http://www.dmitryshulgin.com/wp-content/uploads/2015/06/Global-Hawk-1.jpg] on Jun. 8, 2018, 1 page.

EAD Aerospace, "Middle Eastern VVIPS Wide-Body Honeywell Jetwave STC," retrieved from [https://www.ead-aerospace.com/non-classe/middle-eastern-vvips-wide-body-honeywell-jetwave-stc] on Jun. 8, 2018, 4 pages.

Giragosian et al., "Aerodynamic Design Considerations for Aircraft Radomes", Raytheon Company, 1990 (10 pages).

European Patent Office, "Communication pursuant to Article 94(3) EPC" issued in connection with European Patent Application No. 18162034.5, dated Oct. 25, 2019, 6 pages.

* cited by examiner

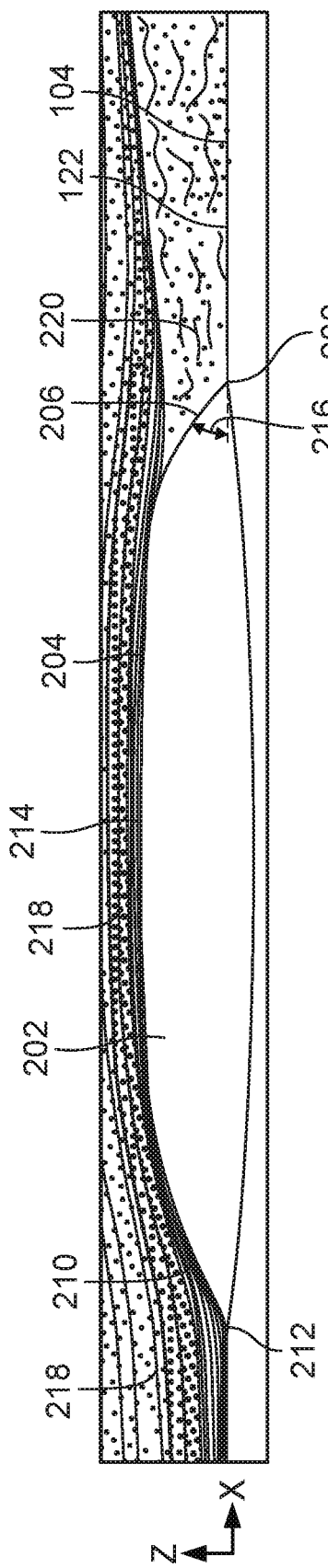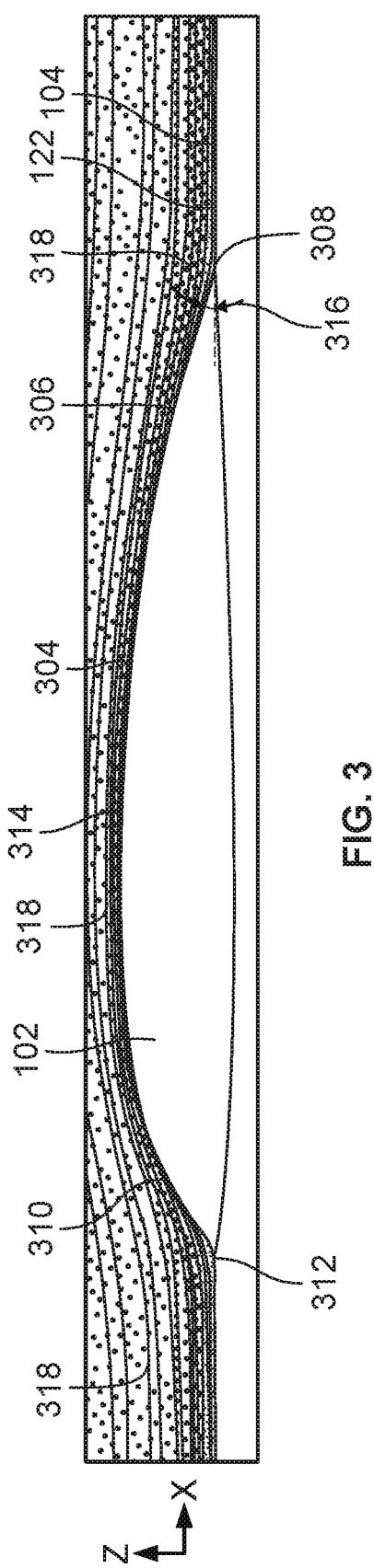
FIG. 2 (PRIOR ART)
FIG. 3

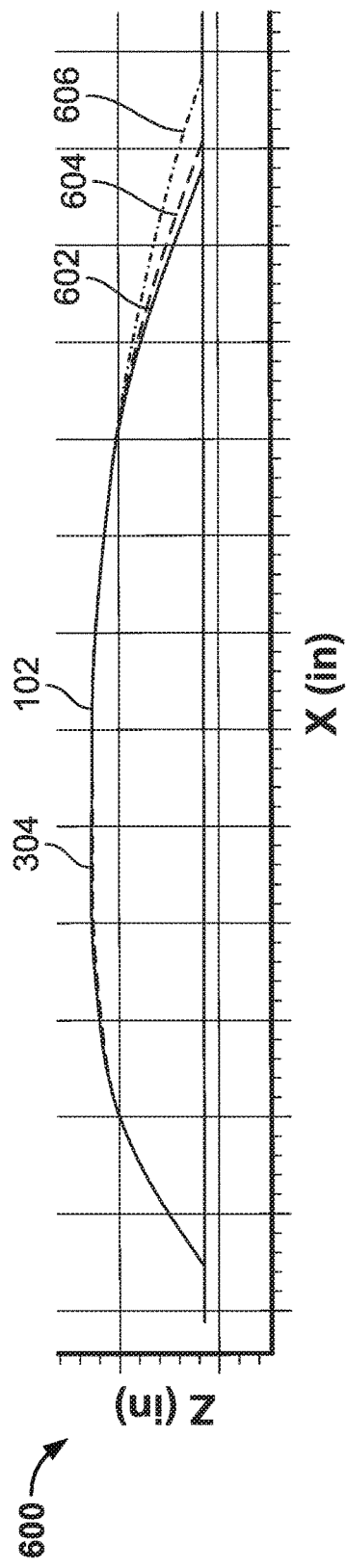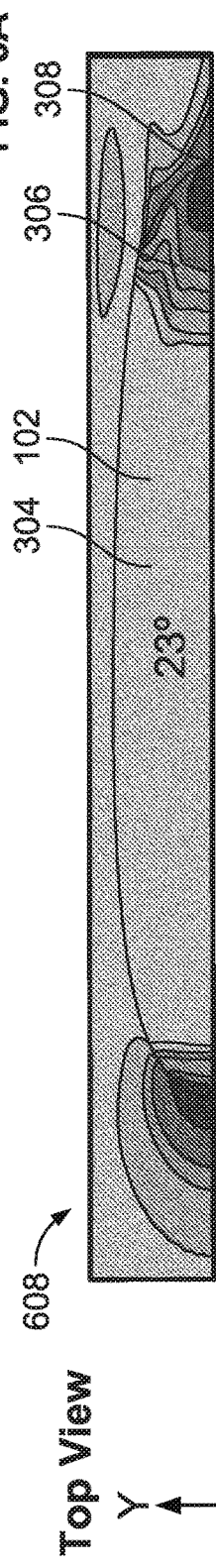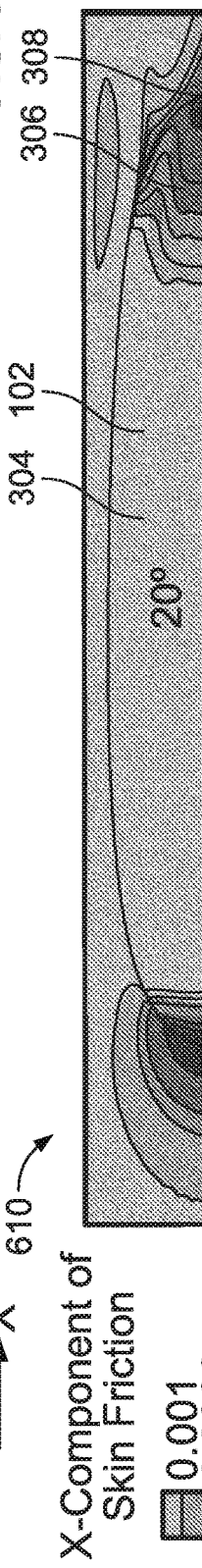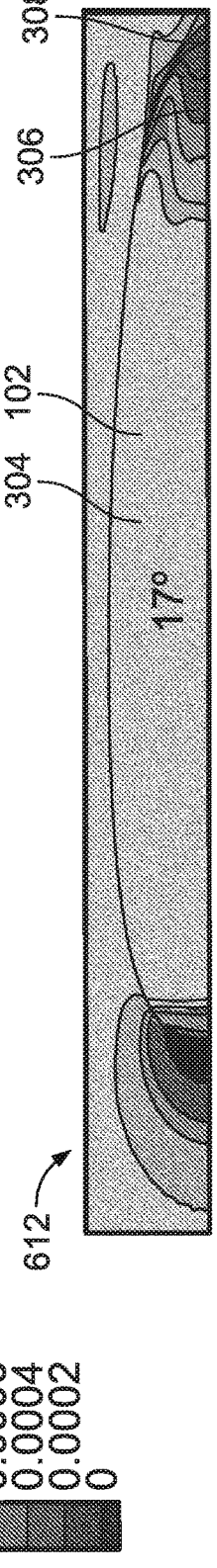

AIRCRAFT RADOME APPARATUSES AND METHODS

FIELD OF HE DISCLOSURE

This disclosure relates generally to aircraft radomes and, more specifically, to improved aircraft radome apparatuses and methods.

BACKGROUND

Radomes are structural enclosures that cover and/or protect aircraft antennas. For example, radomes conceal aircraft antennas from public view while also protecting the antennas from environmental conditions (e.g., ice accumulation). Radomes may be constructed in numerous shapes and/or sizes depending upon the particular design application (e.g., a particular aircraft to which the radome is to be mounted). The size, shape, and/or location of a radome governs the flow of air around the radome, and also influences the transverse cross-sectional area distribution of the aircraft to which the radome is mounted.

A known radome described herein causes separated airflow proximate a trailing portion of the radome during a flight of the aircraft to which the radome is mounted. The presence of separated airflow proximate the trailing portion of the radome results in increased drag on the aircraft, which is an undesirable characteristic of the design from an aerodynamic perspective. As another example, known aircraft radomes are not mounted and/or positioned on aircraft at a location having a positive influence on the transverse cross-sectional area of the aircraft as applied in the transonic area rule.

SUMMARY

Improved radome apparatuses and methods are disclosed herein. In some examples, a radome to be mounted on an aircraft is disclosed. In some disclosed examples, the radome comprises an outer mold line having a closure angle. In some disclosed examples, the closure angle is configured to reduce a footprint of the radome. In some disclosed examples, the closure angle is also configured to reduce a likelihood of separated airflow from occurring proximate a trailing portion of the radome while the aircraft is in flight. In some disclosed examples, the radome is to be mounted on a fuselage of the aircraft at a location that reduces a rate of change of a transverse cross-sectional area of the aircraft.

In some examples, an aircraft is disclosed. In some disclosed examples, the aircraft comprises a radome including an outer mold line having a closure angle. In some disclosed examples, the closure angle is configured to reduce a footprint of the radome. In some disclosed examples, the closure angle is also configured to reduce a likelihood of separated airflow from occurring proximate a trailing portion of the radome while the aircraft is in flight. In some disclosed examples, the radome is mounted on a fuselage of the aircraft at a location that reduces a rate of change of a transverse cross-sectional area of the aircraft.

In some examples, a method is disclosed. In some disclosed examples, the method comprises configuring a closure angle of an outer mold line of a radome of an aircraft. In some disclosed examples, the closure angle is configured to reduce a footprint of the radome. In some disclosed examples, the closure angle is also configured to reduce a likelihood of separated airflow from occurring proximate a trailing portion of the radome while the aircraft is in flight.

In some disclosed examples, the method comprises mounting the radome on a fuselage of the aircraft at a location that reduces a rate of change of a transverse cross-sectional area of the aircraft.

BRIEF DESCRIPTION OF THE DRAWINGS

FIG. 2 is a side view of a known radome having an outer mold line that causes separated airflow proximate a trailing portion of the known radome.

FIG. 3 is a side view of the example radome of FIG. 1 having an example outer mold line that reduces a likelihood of separated airflow from occurring proximate an example trailing portion of the radome of FIG. 1 relative to the known radome of FIG. 2.

FIG. 6A is an example graph illustrating example closure angles evaluated in connection with configuring the example outer mold line of the example radome of FIGS. 1 and 3-5.

FIG. 6B is a first example skin friction map corresponding to the first example closure angle of FIG. 6A.

FIG. 6C is a second example skin friction map corresponding to the second example closure angle of FIG. 6A.

FIG. 6D is a third example skin friction map corresponding to the third example closure angle of FIG. 6A.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Radome apparatuses disclosed herein advantageously include an outer mold line having a closure angle configured to reduce a footprint of the radome and to also maintain attached airflow and/or reduce a likelihood of separated airflow from occurring proximate a trailing portion of the radome during a flight of the aircraft to which the radome is to be mounted. Radome apparatuses disclosed herein are also advantageously configured to be mounted on a fuselage of the aircraft at a location that reduces a rate of change of a transverse cross-sectional area of the aircraft relative to the rate of change of the cross-sectional area of the aircraft in the absence of the radome, thereby altering aerodynamic characteristics related to the transonic area rule. The aforementioned advantages result in operational improvements and/or benefits (e.g., reduced drag, reduced fuel burn, etc.) for an aircraft implementing the radome in place of the known radome described above.

As used herein in reference to a radome, the term "outer mold line" refers to the outer and/or exterior surface of the radome. As used herein in reference to a radome and/or an outer mold line of a radome, the term "closure angle" refers to the angle formed between a trailing portion of the radome outer mold line and a surface of a fuselage on which the radome is mounted and/or is to be mounted.

Figure 1:
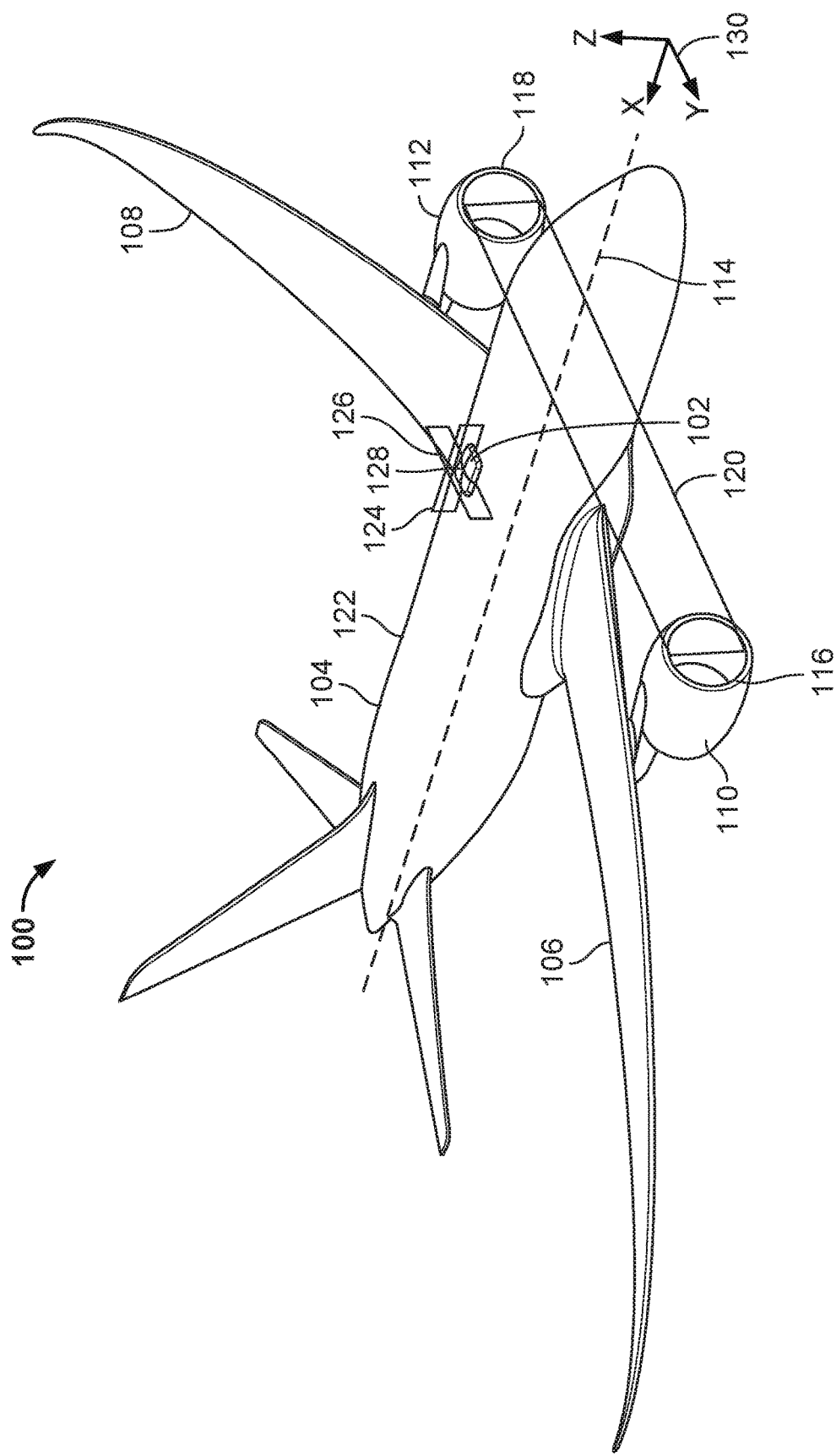
FIG. 1 illustrates an example aircraft in which an example radome may be implemented in accordance with the teachings of this disclosure.

FIG. 1 illustrates an example aircraft 100 in which an example radome 102 may be implemented in accordance with the teachings of this disclosure. The aircraft 100 includes an example fuselage 104, a first example wing 106, a second example wing 108, a first example nacelle 110, and a second example nacelle 112. The fuselage 104 has a generally cylindrical shape that defines an example longitudinal axis 114 of the aircraft 100. The first wing 106 and the second wing 108 are respectively coupled to the fuselage 104. The first nacelle 110 and the second nacelle 112 are respectively coupled to corresponding ones of the first wing 106 and the second wing 108. In the illustrated example of FIG. 1, a first example leading annular surface 116 of the first nacelle 110 and/or a second example leading annular surface 118 of the second nacelle 112 define a first example transverse plane 120.

The radome 102 of FIG. 1 covers one or more antenna(s) (not visible in FIG. 1) of the aircraft 100. The radome 102 is mounted on an example upper surface 122 of the fuselage 104 at a location along the longitudinal axis 114 of the aircraft 100 proximate the location of the first and second wings 106, 108 of the aircraft 100 along the longitudinal axis 114, and/or proximate the location of the first and second nacelles 110, 112 of the aircraft 100 along the longitudinal axis 114. In the illustrated example of FIG. 1, the radome 102 has a first cross-sectional profile along an example longitudinal plane 124, and a second cross-sectional profile along a second example transverse plane 126. The longitudinal plane 124 and the second transverse plane 126 of the radome 102 respectively intersect an example location and/or point 128 corresponding to the greatest vertical extent (e.g., the apex) of the radome 102 along the vertical axis (e.g., the z-axis) of an example coordinate system 130 of FIG. 1. In the illustrated example of FIG. 1, the second transverse plane 126 of the radome 102 is approximately coplanar relative to the first transverse plane 120 of the first and second nacelles 110, 112.

As further described herein, the size, shape and location of the radome 102 are configured relative to the size, shape and location of the aircraft 100 and/or the antennas of the aircraft 100 based on multiple engineering disciplines and/or design considerations. For example, the size and shape (e.g., an outer mold line) of the radome 102 of FIG. 1 may be configured to reduce the footprint of the radome 102 based on ventilation and/or decompression requirements. In some examples, the size and shape of the radome 102 may additionally and/or alternatively be configured to reduce the footprint of the radome 102 based on skin thickness requirements, antenna-to-radome gap requirements, and/or other structural clearance requirements for the radome 102. The size and shape of the radome 102 of FIG. 1 are further configured such that the radome 102 maintains attached airflow and/or reduce a likelihood of separated airflow from occurring proximate a trailing portion and/or trailing edge of the radome 102 during a flight (e.g., cruise and dive conditions) of the aircraft 100. The radome 102 of FIG. 1 is also configured with regard to a transonic area rule influence attributable to the location of the radome 102 on the fuselage 104 of the aircraft 100 relative to the location of the first and second nacelles 110, 112 and/or the first and second wings 106, 108 of the aircraft 100.

FIG. 2 is a side view of a known radome 202 having an outer mold line 204 that causes separated airflow proximate a trailing portion 206 of the known radome 202. In the illustrated example of FIG. 2, the known radome 202 is mounted on an upper surface of a fuselage of an aircraft (e.g., the upper surface 122 of the fuselage 104 of the aircraft 100 of FIG. 1). A longitudinal profile of the outer mold line 204 of the known radome 202 of FIG. 2 is defined by the trailing portion 206 of the known radome 202 having a trailing edge 208, a leading portion 210 of the known radome 202 located opposite the trailing portion 206 and having a leading edge 212, and a middle portion 214 of the known radome 202 extending between the trailing portion 206 and the leading portion 210. As shown in FIG. 2, an example set of organized airflow lines 218 proximate the leading portion 210 and the middle portion 214 of the known radome 202 are indicative of attached airflow, while an example set of chaotic and/or disorganized airflow lines 220 proximate and/or aft the trailing portion 206 of the known radome 202 are indicative of separated airflow. The outer mold line 204 of the known radome 202 of FIG. 2 accordingly causes and/or results in the formation of separated airflow proximate the trailing portion 206 and/or the trailing edge 208 of the known radome 202.

In the illustrated example of FIG. 2, the location and the extent of the separated airflow is attributable in part to a closure angle 216 associated with the trailing portion 206 of the known radome 202 relative to the upper surface of the fuselage of the aircraft to which the known radome 202 is mounted. The closure angle 216 of FIG. 2 is measured as the angle between the upper surface 122 and the approximate slope of the trailing portion 206 of the known radome 202 proximate the trailing edge 208 of the known radome 202 (e.g., the slope of a tangent line intersecting the trailing portion 206 of the known radome 202 proximate the trailing edge 208). In the illustrated example of FIG. 2, the closure angle 216 is approximately thirty-seven degrees (37°). The separated airflow shown in FIG. 2 may occur during a flight (e.g., cruise and/or dive conditions) of an aircraft (e.g., the aircraft 100 of FIG. 1) to which the known radome 202 of FIG. 2 is mounted. The presence of separated airflow proximate the trailing portion 206 of the known radome 202 results in increased drag on the aircraft and the potential for local vibration or buffeting due to unsteady airflow.

FIG. 3 is a side view the example radome 102 of FIG. 1 having an example outer mold line 304 that reduces a likelihood of separated airflow from occurring proximate an example trailing portion 306 of the radome 102 of FIG. 1 relative to the known radome 202 of FIG. 2. In the illustrated example of FIG. 3, the radome 102 is mounted on an upper surface of a fuselage of an aircraft (e.g., the upper surface 122 of the fuselage 104 of the aircraft 100 of FIG. 1). A longitudinal profile of the outer mold line 304 of the radome 102 of FIG. 3 is defined by the trailing portion 306 of the radome 102 having an example trailing edge 308, an example leading portion 310 of the radome 102 located opposite the trailing portion 306 and having an example leading edge 312, and an example middle portion 314 of the radome 102 extending between the trailing portion 306 and the leading portion 310. As shown in FIG. 3, an example set of organized airflow lines 318 proximate the leading portion 310, the middle portion 314, and the trailing portion 306 of the radome 102 are indicative of attached airflow. The outer mold line 304 of the radome 102 of FIG. 3 accordingly maintains attached airflow and/or reduces a likelihood of separated airflow proximate the trailing portion 306 and/or the trailing edge 308 of the radome 102.

In the illustrated example of FIG. 3, the attached airflow is attributable in part to an example closure angle 316 associated with the trailing portion 306 of the radome 102 relative to the upper surface of the fuselage of the aircraft to which the radome 102 is mounted. The closure angle 316 of FIG. 3 is measured as the angle between the upper surface 122 and the approximate slope of the trailing portion 306 of the radome 102 proximate the trailing edge 308 of the radome 102 (e.g., the slope of a tangent line intersecting the trailing portion 306 of the radome 102 proximate the trailing edge 308). In the illustrated example of FIG. 3, the closure angle 316 is approximately seventeen degrees (17°). The attached airflow of FIG. 3 may occur during a flight (e.g., cruise and/or dive conditions) of an aircraft (e.g., the aircraft 100 of FIG. 1) to which the radome 102 of FIG. 3 is mounted. The presence of attached airflow and/or the absence of separated airflow proximate the trailing portion 306 and/or the trailing edge 308 of the radome 102 results in decreased drag on the aircraft and reduces (e.g., eliminates) the possibility of local vibration and buffeting. Thus, the closure angle 316 of the radome 102 of FIG. 3 provides an operational improvement (e.g., lower drag) to the aircraft relative to the closure angle 216 of the known radome 202 of FIG. 2.

A process for configuring and/or determining the closure angle 316 of the outer mold line 304 of the radome 102 of FIGS. 1 and 3 is further described below in connection with FIGS. 6A, 6B, 6C and 6D. In some examples, the process for configuring the closure angle 316 of the outer mold line 304 of the radome 102 of FIGS. 1 and 3 occurs subsequent to and/or in conjunction with one or more process(es) for configuring the size and shape of the outer mold line 304 of the radome 102 to reduce the footprint of the radome 102 while also satisfying skin thickness requirements, antenna-to-radome gap requirements, ventilation and/or decompression requirements, and/or other structural clearance requirements associated with the radome 102 and/or with an aircraft (e.g., the aircraft 100 of FIG. 1) to which the radome 102 of FIGS. 1 and 3 is to be mounted.

Figure 4:
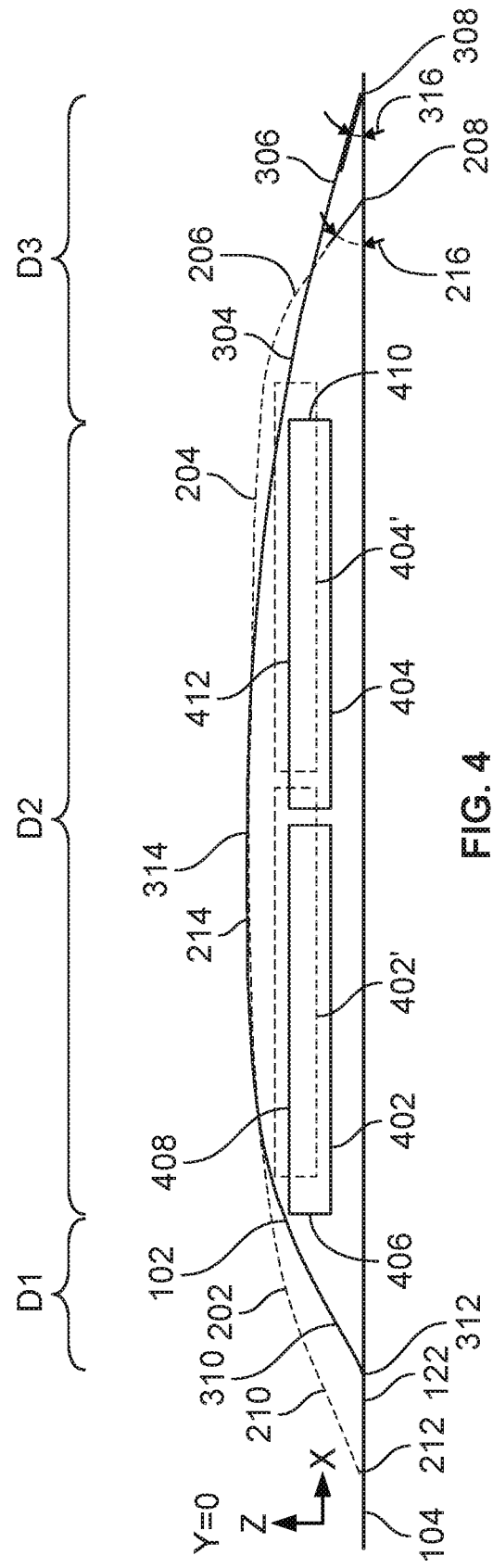
FIG. 4 is a cross-sectional view of the example outer mold line of the example radome of FIGS. 1 and 3 taken along the example longitudinal plane of FIG. 1.

FIG. 4 is a cross-sectional view of the example outer mold line 304 of the example radome 102 of FIGS. 1 and 3 taken along the example longitudinal plane 124 of FIG. 1. As shown in FIG. 4, the radome 102 covers an example forward antenna 402 and an example aft antenna 404. The forward antenna 402 includes an example forward surface 406 and an example upper surface 408. The aft antenna 404 includes an example aft surface 410 and an example upper surface 412. As described above in connection with FIG. 3, the longitudinal profile of the outer mold line 304 of the radome 102 is defined by the trailing portion 306 of the radome 102 having the trailing edge 308, the leading portion 310 of the radome 102 having the leading edge 312, and the middle portion 314 of the radome 102 extending between the trailing portion 306 and the leading portion 310. In the illustrated example of FIG. 4, the leading portion 310 of the radome 102 spans longitudinally (e.g., along the x-axis) from the leading edge 312 of the radome 102 to the forward surface 406 of the forward antenna 402, as indicated by the illustrated distance "D1" of FIG. 4. The middle portion 314 of the radome 102 spans longitudinally from the forward surface 406 of the forward antenna 402 to the aft surface 410 of the aft antenna 404, as indicated by the illustrated distance "D2" of FIG. 4. The trailing portion 306 of the radome 102 spans longitudinally from the aft surface 410 of the aft antenna 404 to the trailing edge 308 of the radome 102, as indicated by the illustrated distance "D3" of FIG. 4. An overall longitudinal span of the radome 102 is equal to the sum of the distances D1, D2 and D3 illustrated in FIG. 4.

FIG. 4 further includes a superimposed (illustrated in phantom) cross-sectional view of the outer mold line 204 of the known radome 202 of FIG. 2 taken along the example longitudinal plane 124 of FIG. 1. In a known implementation of the radome 202, the forward antenna 402 and the aft antenna 404 shown in FIG. 4 are instead located as shown in phantom and respectively indicated by corresponding reference numerals 402' and 404'. Thus, the respective positions of the forward antenna 402 and the aft antenna 404 are moved downward (e.g., closer to the upper surface 122 of the fuselage 104 of the aircraft 100) when implemented in connection with the radome 102 of FIG. 4 relative to the corresponding positions of the forward antenna 402' and the aft antenna 404' when implemented in connection with the known radome 202 of FIG. 4.

Lowering the forward antenna 402 and the aft antenna 404 to their respective positions as shown in FIG. 4 enables the radome 102 to be closed out (e.g., via the closure angle 316) in a manner that is more conducive to maintaining attached airflow relative to the closure angle 216 associated with the known radome 202, which results in separated airflow. Lowering the forward antenna 402 and the aft antenna 404 to their respective positions as shown in FIG. 4 also enables the longitudinal span (e.g., the distance "D1") of the leading portion 310 of the radome 102 of FIG. 4 to be reduced relative to the longitudinal span of the leading portion 210 of the known radome 202, thereby reducing the footprint of the radome 102.

Figure 5:
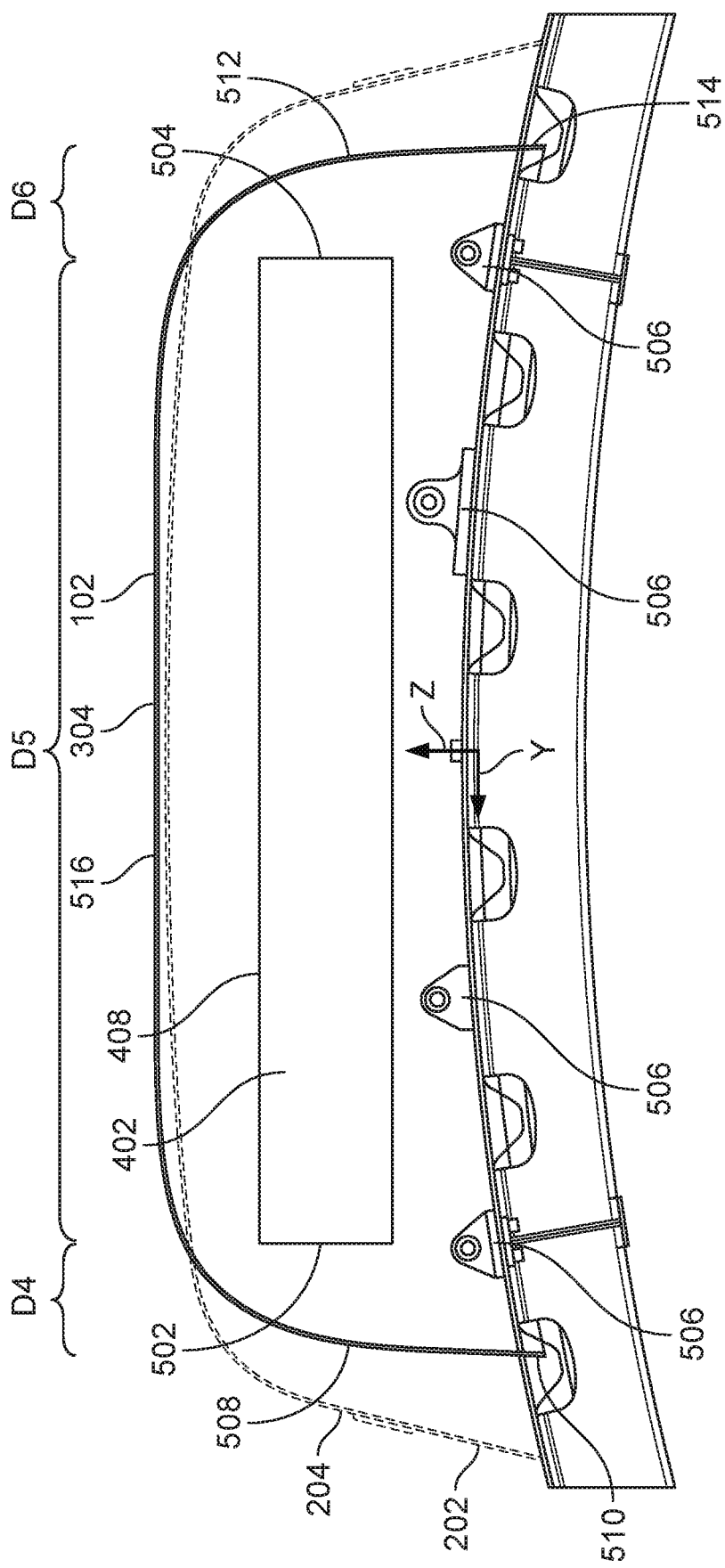
FIG. 5 is a cross-sectional view of the example outer mold line of the example radome of FIGS. 1, 3 and 4 taken along the second example transverse plane of FIG. 1.

FIG. 5 is a cross-sectional view of the example outer mold line 304 of the example radome 102 of FIGS. 1, 3 and 4 taken along the second example transverse plane 126 of FIG. 1. The second transverse plane 126 intersects the apex and/or greatest vertical extent (e.g., along the z-axis) of the radome 102 of FIGS. 1, 3 and 4. As shown in FIG. 5, the radome 102 covers the forward antenna 402 of FIG. 4. In the illustrated example of FIG. 5, the forward antenna 402 includes the upper surface 408, a first example side surface 502, and a second example side surface 504 located opposite the first side surface 502. The radome 102 also covers the rearward antenna 404 of FIG. 4 (not visible in FIG. 5), and a plurality of structural attachment lugs 506. The structural attachment lugs 506 may attach (e.g., directly or indirectly) one or more portions of the radome 102 to a fuselage of an aircraft (e.g., the fuselage 104 of the aircraft 100 of FIG. 1).

As shown in FIG. 5, a transverse profile of the outer mold line 304 of the radome 102 is defined by a first example lateral portion 508 of the radome 102 having a first example lateral edge 510, a second example lateral portion 512 of the radome 102 located opposite the first lateral portion 508 and having an second example lateral edge 514, and an example central portion 516 of the radome 102 extending between the first lateral portion 508 and the second lateral portion 512. In the illustrated example of FIG. 5, the first lateral portion 508 of the radome 102 spans transversely (e.g., along the y-axis) from the first lateral edge 510 of the radome 102 to the first side surface 502 of the forward antenna 402, as indicated by the illustrated distance "D4" of FIG. 5. The central portion 516 of the radome 102 spans transversely from the first side surface 502 of the forward antenna 402 to the second side surface 504 of the forward antenna 402, as indicated by the illustrated distance "D5" of FIG. 5. The second lateral portion 512 of the radome 102 spans transversely from the second side surface 504 of the forward antenna 402 to the second lateral edge 514 of the radome 102, as indicated by the illustrated distance "D6" of FIG. 5. An overall transverse span of the radome 102 is equal to the sum of the distances D4, D5 and D6 illustrated in FIG. 5.

FIG. 5 further includes a superimposed (illustrated in phantom) cross-sectional view of the outer mold line 204 of the known radome 202 of FIG. 2 taken along a transverse plane that intersects the apex and/or greatest vertical extent (e.g., along the z-axis) of the known radome 202 of FIG. 2. As shown in FIG. 5, the overall transverse span of the radome 102 (e.g., as defined by the sum of the distances "D4", "D5" and "D6") is reduced relative to the overall transverse span of the known radome 202, thereby reducing the footprint of the radome 102.

In the illustrated example of FIGS. 4 and 5, the size and shape (e.g., the outer mold line 304) of the radome 102 are configured, based on the sizes, shapes and locations of the forward antenna 402, the aft antenna 404, and the structural attachment lugs 506 to reduce the footprint of the radome 102 while also satisfying skin thickness requirements, antenna-to-radome gap requirements, ventilation and/or decompression requirements, and/or other structural clearance requirements associated with the radome 102 and/or the aircraft (e.g., the aircraft 100 of FIG. 1) to which the radome 102 is to be mounted. For example, ventilation and/or decompression requirements may dictate that the radome 102 be able to support a specified amount of pressure in response to a rapid decompression event. Skin thickness requirements may dictate that the radome 102 has a minimum skin thickness of at least 0.222 inches and a maximum skin thickness of no more than 0.244 inches proximate the forward antenna 402, and a minimum skin thickness of at least 0.263 inches and a maximum skin thickness of no more than 0.285 inches proximate the aft antenna 404. Antenna-to-radome gap requirements may dictate that a minimum gap of at least 0.5 inches must exist between any inner surface of the radome 102 (e.g., an inner mold line relative to the outer mold line 304) and any surface of the forward antenna 402 and/or the aft antenna 404. Other structural clearance requirements may dictate similar gap clearance requirements between the inner surface of the radome 102 and other structures (e.g., the structural attachment lugs 506 of FIG. 5) covered by the radome 102. The radome 102 of FIGS. 1 and 3-5 is configured such that the footprint of the radome 102 (e.g., as defined by the respective longitudinal and transverse extents of the outer mold line 304) is reduced while also satisfying the example skin thickness, antenna-to-radome gap, ventilation and/or decompression, and/or structural clearance requirements discussed above.

In addition to configuring the radome 102 of FIGS. 1 and 3-5 such that the footprint of the radome 102 is reduced while also satisfying the example skin thickness, antenna-to-radome gap, ventilation and/or decompression, and/or structural clearance requirements discussed above, the closure angle 316 of the radome 102 is also configured to maintain attached airflow and/or reduce a likelihood of separated airflow from occurring proximate the trailing portion 306 and/or the trailing edge 308 of the radome 102 during a flight of an aircraft (e.g., the aircraft 100 of FIG. 1) to which the radome 102 is to be mounted.

FIG. 6A is an example graph 600 illustrating example closure angles evaluated in connection with configuring the example outer mold line 304 of the example radome 102 of FIGS. 1 and 3-5. The graph 600 of FIG. 6A illustrates a first example closure angle 602 of the outer mold line 304, a second example closure angle 604 of the outer mold line 304, and a third example closure angle 606 of the outer mold line 304. The first closure angle 602 is approximately twenty-three degrees (23°), the second closure angle 604 is approximately twenty degrees (20°), and the third closure angle 606 is approximately seventeen degrees (17°).

FIG. 6B is a first example skin friction map 608 corresponding to the first example closure angle 602 of FIG. 6A. The first skin friction map 608 illustrates predicted skin friction across the outer mold line 304 of the radome 102 for a modeled flight and/or aircraft speed of approximately Mach 0.8. An absence of skin friction (e.g., a skin friction value of zero) on the first skin friction map 608 is indicative of separated airflow, while a presence of skin friction (e.g., a skin friction value other than zero) on the first skin friction map 608 is indicative of attached airflow. As shown in the first skin friction map 608 of FIG. 6B, the first closure angle 602 of twenty-three degrees (23°) causes separated airflow proximate the trailing portion 306 and/or the trailing edge 308 of the radome 102, as indicated by the absence of skin friction (e.g., a skin friction value of zero) in FIG. 6B proximate the trailing portion 306 and/or the trailing edge 308 of the radome 102. Thus, the first closure angle 602 of twenty-three degrees (23°) is not a suitable choice for configuring the radome 102.

FIG. 6C is a second example skin friction map 610 corresponding to the second example closure angle 604 of FIG. 6A. The second skin friction map 610 illustrates predicted skin friction across the outer mold line 304 of the radome 102 for a modeled flight and/or aircraft speed of approximately Mach 0.8. An absence of skin friction (e.g., a skin friction value of zero) on the second skin friction map 610 is indicative of separated airflow, while a presence of skin friction (e.g., a skin friction value other than zero) on the second skin friction map 610 is indicative of attached airflow. As shown in second skin friction map 610 of FIG. 6C, the second closure angle 604 of twenty degrees (20°) also causes separated airflow proximate the trailing portion 306 and/or the trailing edge 308 of the radome 102, as indicated by the absence of skin friction (e.g., a skin friction value of zero) in FIG. 6C proximate the trailing portion 306 and/or the trailing edge 308 of the radome 102. Although the extent and/or degree of the separated airflow shown in FIG. 6C is not as severe as that shown in FIG. 6B, the separated airflow nonetheless exists. Thus, the second closure angle 604 of twenty degrees (20°), while being a better choice than the first closure angle 602 of twenty-three degrees (23°), is still not a suitable choice for configuring the radome 102.

FIG. 6D is a third example skin friction map 612 corresponding to the third example closure angle 606 of FIG. 6A. The third skin friction map 612 illustrates predicted skin friction across the outer mold line 304 of the radome 102 for a modeled flight and/or aircraft speed of approximately Mach 0.8. An absence of skin friction (e.g., a skin friction value of zero) on the third skin friction map 612 is indicative of separated airflow, while a presence of skin friction (e.g., a skin friction value other than zero) on the third skin friction map 612 is indicative of attached airflow. As shown in FIG. 6D, the third closure angle 606 of seventeen degrees (17°) maintains attached airflow and/or reduces a likelihood of separated airflow proximate the trailing portion 306 and/or the trailing edge 308 of the radome 102, as indicated by the presence of skin friction (e.g., a skin friction value other than zero) proximate the trailing portion 306 and/or the trailing edge 308 of the radome 102. Thus, the third closure angle 606 of seventeen degrees (17°) is a suitable choice for configuring the radome 102. Substantially reducing the closure angle of the radome 102 relative to the third closure angle 606 of seventeen degrees (17°) may create a negative tradeoff with respect to configuring (e.g., reducing) the overall footprint of the radome 102. For example, while implementing a closure angle of ten degrees (10°) may likewise maintain attached airflow and/or reduces a likelihood of separated airflow proximate the trailing portion 306 and/or the trailing edge 308 of the radome 102, reducing the closure angle by this extent adversely results in a substantial increase in the longitudinal span of the trailing portion 306, and/or the overall footprint, of the radome 102. Increasing the footprint of the radome drives excessive ventilation requirements to mitigate potential structural failure in the event of rapid decompression. Accordingly, a desirable closure angle (e.g., the closure angle 316 of FIGS. 3 and 4) of the outer mold line 304 and/or the radome 102 of FIGS. 1 and 3-5 is between sixteen degrees (16°) eighteen degrees (18°), and preferably approximately seventeen degrees (17°).

In addition to configuring the size and shape (e.g., the outer mold line 304) of the radome 102 of FIGS. 1 and 3-5 to reduce the footprint of the radome 102 based on skin thickness requirements, antenna-to-radome gap requirements, ventilation and/or decompression requirements, and/or other structural clearance requirements of the radome 102, while at the same time maintaining attached airflow and/or reducing a likelihood of separated airflow proximate the trailing portion 306 and/or the trailing edge 308 of the radome 102, the radome 102 is further configured with regard to a transonic area rule influence attributable to the location of the radome 102 on the fuselage 104 of the aircraft 100. The transonic area rule dictates that the shape of an aircraft should change in cross-sectional area as smoothly as possible. Application of the transonic area rule to the design of an aircraft (e.g., the aircraft 100 of FIG. 1) results in reduced levels and/or counts of drag occurring at transonic and supersonic speeds of the aircraft, particularly between Mach 0.7 and Mach 1.2. Thus, application of the transonic area rule to the design of an aircraft may provide operational improvements and/or benefits for the aircraft when traveling at speeds between Mach 0.7 and Mach 1.2.

Figure 7:
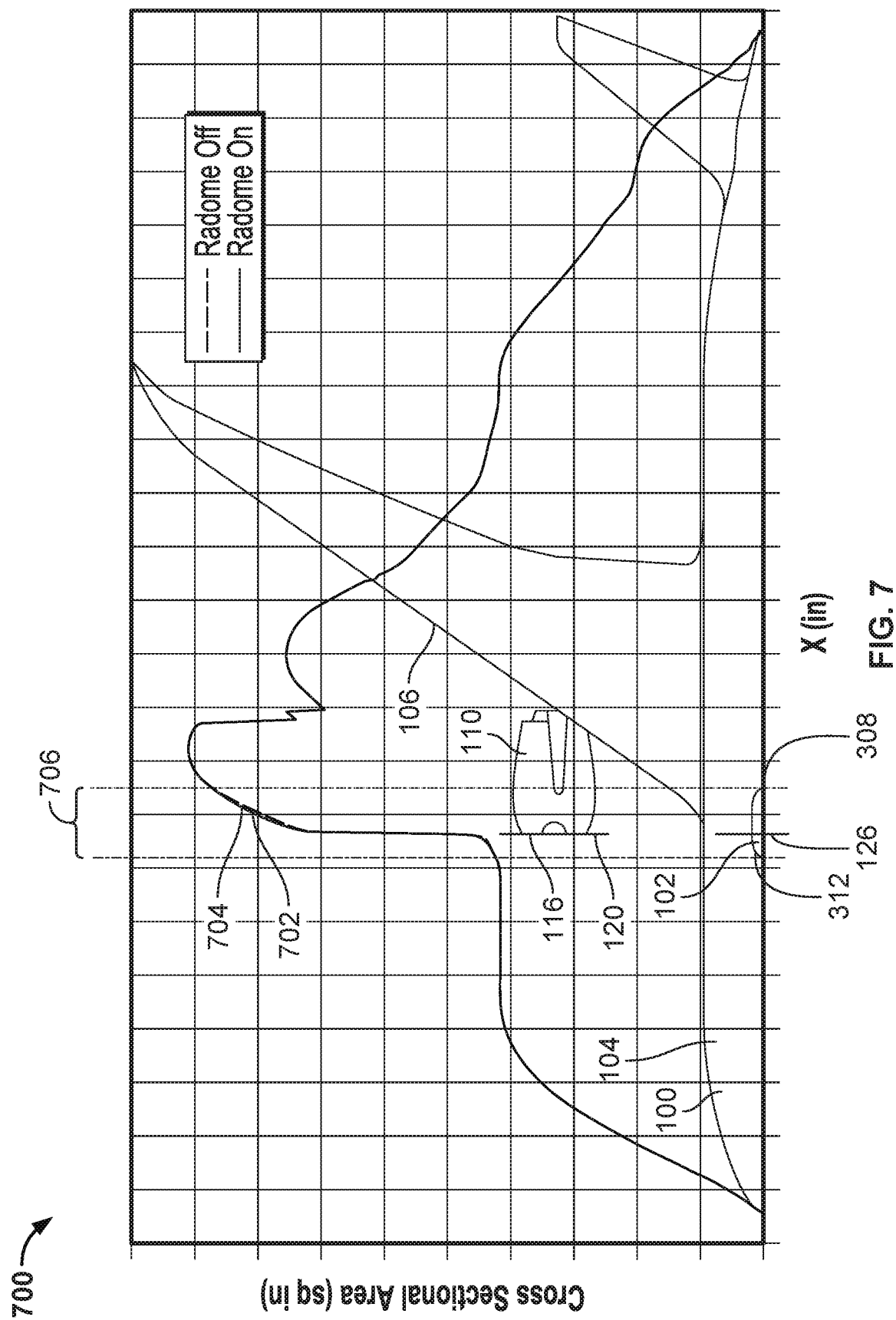
FIG. 7 is an example graph illustrating the transverse cross-sectional area of the example aircraft of FIG. 1 as a function of position along the example longitudinal axis of the aircraft.
Figure 8:
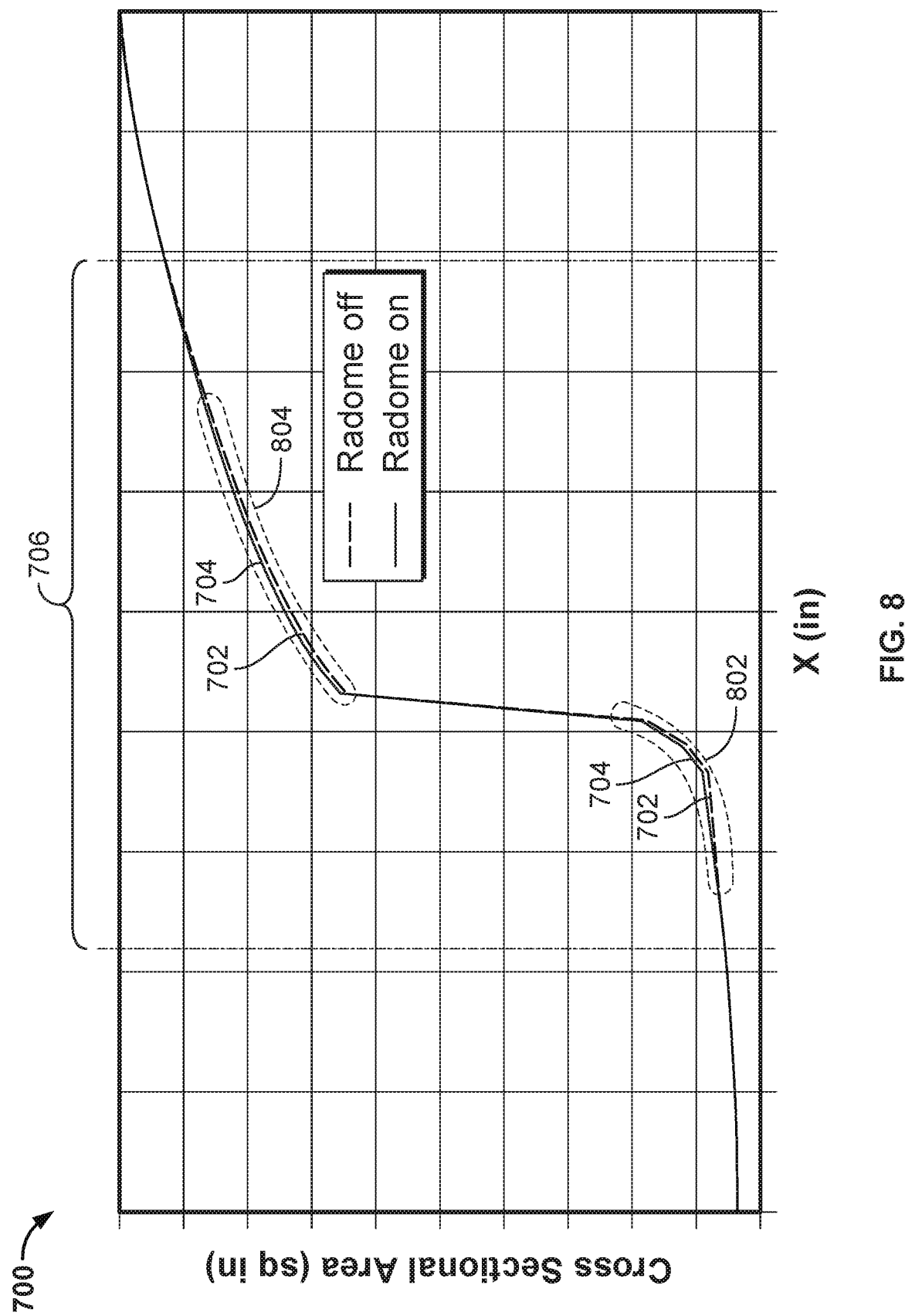
FIG. 8 is an enlargement of the example graph of FIG. 7 focusing on the example influence zone of FIG. 7.

FIG. 7 is an example graph 700 illustrating the transverse cross-sectional area of the example aircraft 100 of FIG. 1 as a function of position along the example longitudinal axis 114 of the aircraft 100. A first example plot 702 of the graph 700 illustrates the transverse cross-sectional area of the aircraft 100 in the absence of the radome 102 of FIGS. 1 and 3-5. A second example plot 704 of the graph 700 illustrates the transverse cross-sectional area of the aircraft 100 including the radome 102 of FIGS. 1 and 3-5. An example influence zone 706 associated with the radome 102 is defined as the longitudinal span between the leading edge 312 of the radome 102 and the trailing edge 308 of the radome 102. FIG. 8 is an enlargement of the example graph 700 of FIG. 7 focusing on the example influence zone 706 of FIG. 7. As shown in the graph 700 of FIGS. 7 and 8, the greatest rate of change (e.g., the greatest slope) of the first plot 702 occurs in relation to increases in the transverse cross-sectional area of the aircraft 100 attributable to the nacelles (e.g., the first nacelle 110 of FIGS. 1 and 7) and the wings (e.g., the first wing 106 of FIGS. 1 and 7) of the aircraft 100.

In the illustrated example of FIGS. 7 and 8, the location at which the radome 102 is mounted on the fuselage 104 of the aircraft 100 (e.g., the location of the influence zone 706) relative to the nacelles and/or the wings of the aircraft is configured in accordance with the transonic area rule to reduce the rate of change of the transverse cross-sectional area of the aircraft 100 relative to the rate of change of the cross-sectional area of the aircraft 100 in the absence of the radome 102. For example, as discussed above in connection with FIG. 1, the first leading annular surface 116 of the first nacelle 110 defines (along with the second leading annular surface 118 of the second nacelle 112, not shown in FIG. 7) the first transverse plane 120. The second transverse plane 126 of FIG. 1 intersects the apex and/or greatest vertical extent of the radome 102. As shown in FIG. 7, the longitudinal span of the radome 102 overlaps the first transverse plane 120, and the second transverse plane 126 is aligned with, and/or is approximately coplanar relative to, the first transverse plane 120.

Figure 9:
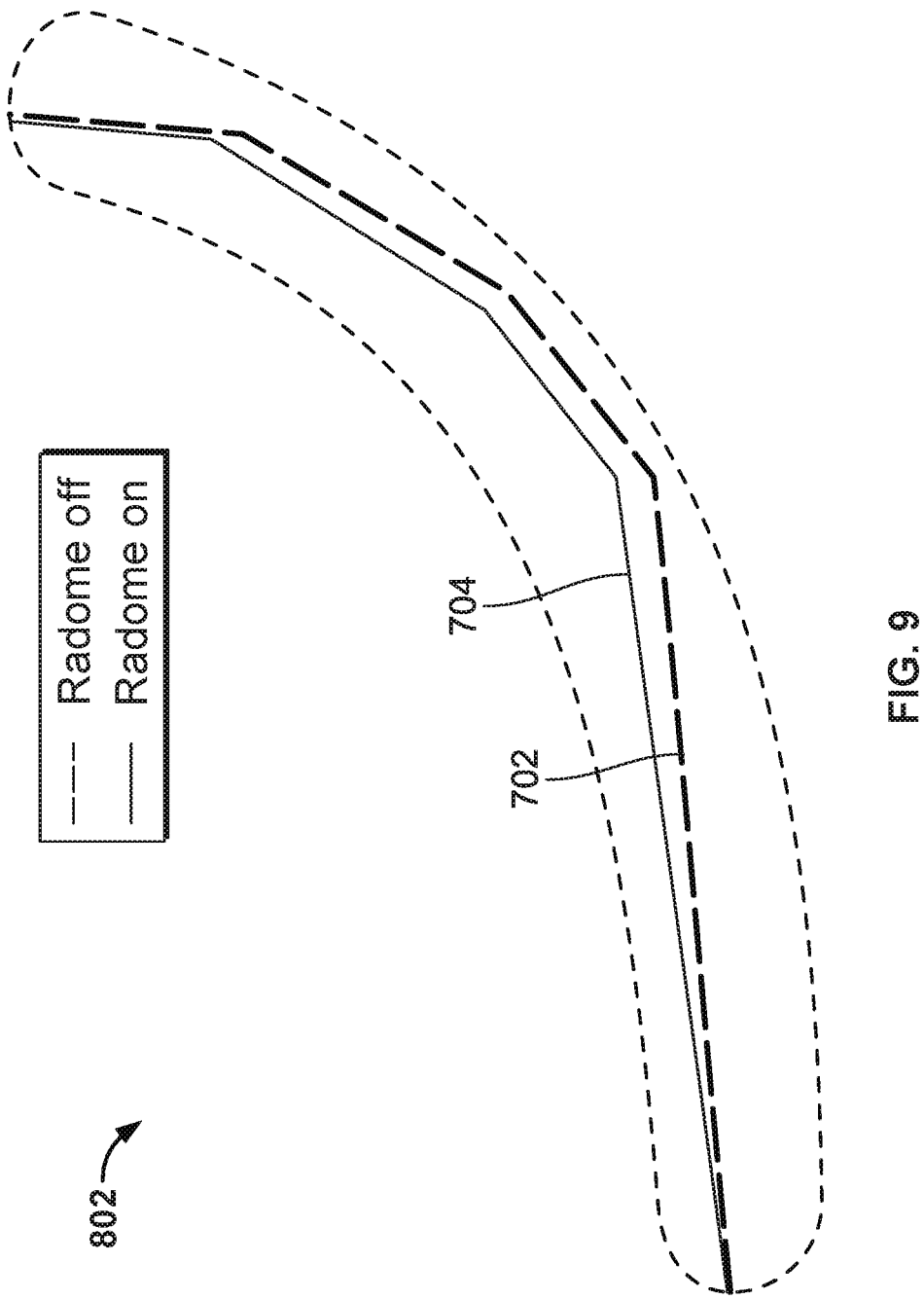
FIG. 9 is an enlargement of the example graph of FIG. 8 focusing on the first example smoothed area of FIG. 8.

By locating the radome 102 on the fuselage 104 relative to the nacelles (e.g., first and second nacelles 110, 112) and/or the wings (e.g., first and second wings 106, 108) of the aircraft 100 in the aforementioned manner (e.g., aligning the second transverse plane 126 with the first transverse plane 120), the position and/or location of the influence zone 706 associated with the radome 102 is configured to reduce the rate of change of the transverse cross-sectional area of the aircraft 100 relative to the rate of change of the cross-sectional area of the aircraft 100 in the absence of the radome 102. For example, as shown in FIG. 8, the placement of the radome 102 provides for changes in the slope of the second plot 704 within the influence zone 706 that are smoother and/or more gradual relative to the corresponding changes in the slope of the first plot 702 within the influence zone 706. Such smoothing can be seen, for example, at a first example smoothed area 802 and a second example smoothed area 804 of the graph 700 of FIG. 8. FIG. 9 is an enlargement of the example graph 700 of FIG. 8 focusing on the first example smoothed area 802 of FIG. 8.

The above-described configuration of the radome 102 of FIGS. 1 and 3-5 results in operational improvements and/or benefits for an aircraft (e.g., the aircraft 100 of FIG. 1) implementing the radome 102 in place of the known radome 202 of FIGS. 2, 4 and 5. For example, the known radome 200 of FIGS. 2, 4 and 5 has a maximum length (e.g., measured along the x-axis) of 118.2 inches, a maximum width (e.g., measured along the y-axis) of 52.6 inches, and a maximum height (e.g., measured along the z-axis) of 11.0 inches. The closure angle 216 of the known radome 202 of FIGS. 2, 4 and 5 is 37.0 degrees, and the wetted area of the known radome 202 of FIGS. 2, 4 and 5 is 46.9 square feet. In contrast, the radome 102 has a maximum length (e.g., measured along the x-axis) of 117.5 inches, a maximum width (e.g., measured along the y-axis) of 44.0 inches, and a maximum height (e.g., measured along the z-axis) of 11.1 inches. The closure angle 316 of the radome 102 of FIGS. 1 and 3-5 is 17.0 degrees, and the wetted area of the radome 102 of FIGS. 1 and 3-5 is 40.5 square feet. Based on these respective parameters of the radome 102 and the known radome 202, it is expected that an aircraft implementing the radome 102 in place of the known radome 202 will benefit from a reduction in drag and/or a reduction in fuel burn attributable to the size, shape and location of the radome 102.

Figure 10:
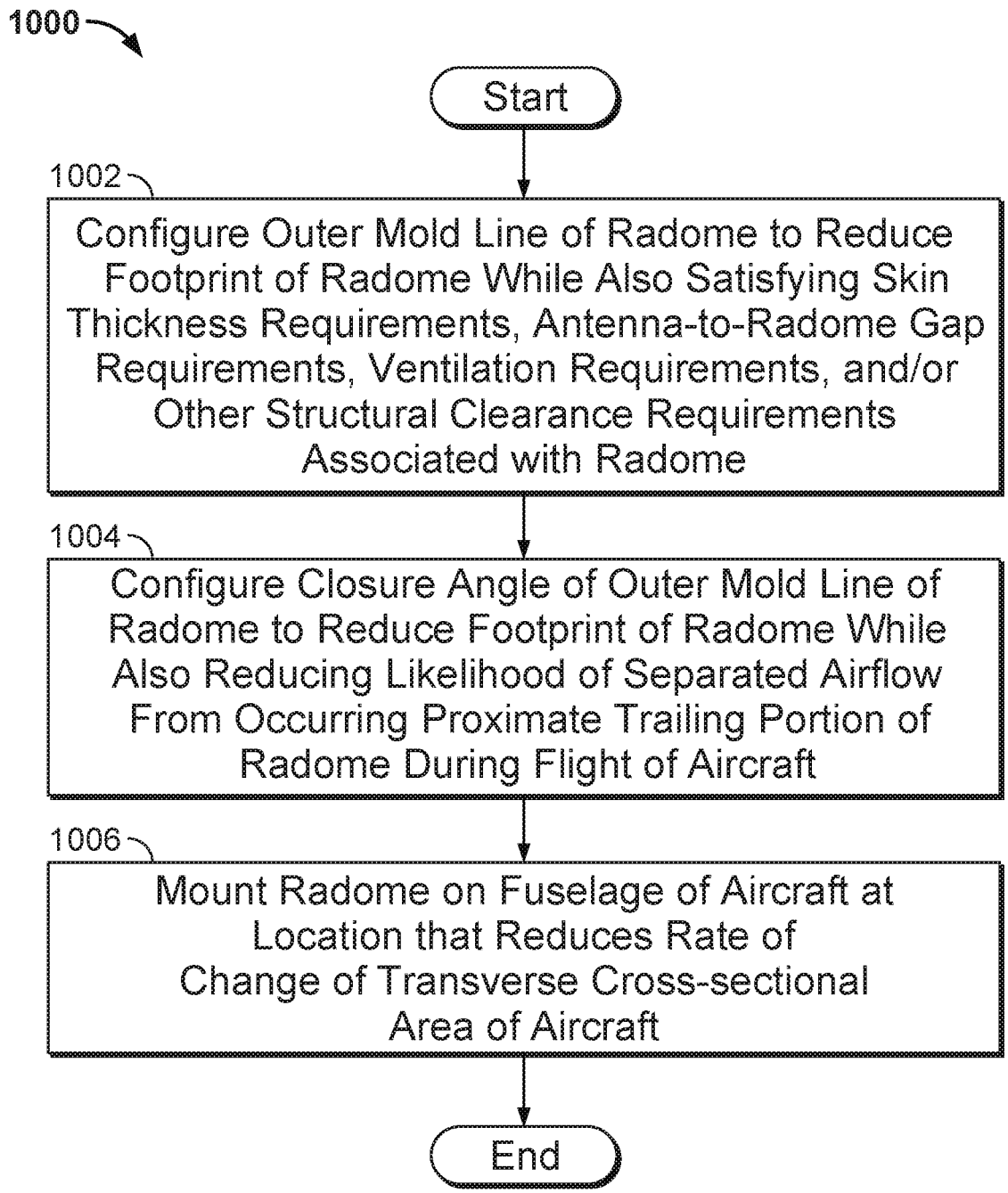
FIG. 10 is a flowchart representative of an example method for configuring the example radome of FIGS. 1, 3-5 and 7-9 for integration with the example aircraft of FIG. 1.

FIG. 10 is a flowchart representative of an example method 1000 for configuring the example radome 102 of FIGS. 1, 3-5 and 7-9 for integration with the example aircraft 100 of FIG. 1. The method 1000 of FIG. 10 begins with configuring an outer mold line of a radome to reduce the footprint of the radome while also satisfying skin thickness requirements, antenna-to-radome gap requirements, ventilation and/or decompression requirements, and/or other structural clearance requirements associated with the radome (block 1002). For example, the outer mold line 304 of the radome 102 of FIGS. 1, 3-5 and 7-9 may be configured to reduce the footprint of the radome 102 while also satisfying the example skin thickness requirements, the example antenna-to-radome gap requirements, and the example ventilation and/or decompression requirements associated with the radome 102 and/or the aircraft 100 of FIG. 1, as discussed above in connection with FIGS. 4 and 5.

The method 1000 of FIG. 10 further includes configuring a closure angle of the outer mold line of the radome to reduce the footprint of the radome while also reducing a likelihood of separated airflow from occurring proximate a trailing portion of the radome during a flight of the aircraft (block 1004). For example, the closure angle 316 of the outer mold line 304 of the radome 102 of FIGS. 1, 3-5 and 7-9 may be configured to reduce the footprint of the radome 102 while also reducing a likelihood of separated airflow from occurring proximate the trailing portion 306 and/or the trailing edge 308 of the radome 102 during a flight (e.g., cruise and dive conditions) of the aircraft 100 of FIG. 1. In some examples, the closure angle may be configured to be approximately seventeen degrees (17°). In some examples, the flight of the aircraft may include a speed of Mach 0.8.

The method 1000 of FIG. 10 further includes mounting the radome on a fuselage of the aircraft at a location that reduces a rate of change of a transverse cross-sectional area of the aircraft (block 1006). For example, the radome 102 of FIGS. 1, 3-5 and 7-9 may be mounted on the fuselage 104 of the aircraft 100 of FIG. 1 at a location that reduces a rate of change of the cross-sectional area of the aircraft 100 relative to the rate of change of the cross-sectional area of the aircraft 100 in the absence of the radome 102. In some examples, a longitudinal span of the radome 102 overlaps a leading annular surface of a nacelle (e.g., the first leading annular surface 116 of the first nacelle 110 of FIG. 1) of the aircraft 100 when the radome 102 is mounted at the location. In some examples, the leading annular surface of the nacelle defines a first transverse plane (e.g., the first transverse plane 120 of FIG. 1). In some examples, a second transverse plane (e.g., the second transverse plane 126 of FIG. 1) that intersects an apex of the radome 102 is approximately coplanar with the first transverse plane when the radome 102 is mounted at the location. Following block 1006, the example method 1000 of FIG. 10 ends.

From the foregoing, it will be appreciated that the disclosed radome apparatuses advantageously include an outer mold line having a closure angle configured to reduce a footprint of the radome and to also maintain attached airflow and/or reduce a likelihood of separated airflow from occurring proximate a trailing portion of the radome during a flight of the aircraft to which the radome is to be mounted. The radome apparatuses disclosed herein are also advantageously configured to be mounted on a fuselage of the aircraft at a location that reduces a rate of change of a transverse cross-sectional area of the aircraft relative to the rate of change of the cross-sectional area of the aircraft in the absence of the radome, thereby satisfying the transonic area rule. The aforementioned advantages result in operational improvements and/or benefits (e.g., reduced drag, reduced fuel burn, etc.) for an aircraft implementing the radome in place of the known radome described above.

In some examples, a radome to be mounted on an aircraft is disclosed. In some disclosed examples, the radome comprises an outer mold line having a closure angle. In some disclosed examples, the closure angle is configured to reduce a footprint of the radome. In some disclosed examples, the closure angle is also configured to reduce a likelihood of separated airflow from occurring proximate a trailing portion of the radome during a flight of the aircraft. In some disclosed examples, the radome is to be mounted on a fuselage of the aircraft at a location that reduces a rate of change of a transverse cross-sectional area of the aircraft.

In some disclosed examples, the closure angle is approximately 17 degrees. In some disclosed examples, the flight includes a speed of Mach 0.8.

In some disclosed examples, a longitudinal span of the radome overlaps a leading annular surface of a nacelle of the aircraft when the radome is mounted at the location. In some disclosed examples, the leading annular surface of the nacelle defines a first transverse plane. In some disclosed examples, a second transverse plane that intersects an apex of the radome is to be approximately coplanar with the first transverse plane when the radome is mounted at the location. In some disclosed examples, the radome is to cover a first antenna and a second antenna when the radome is mounted at the location. In some disclosed examples, the second antenna is located aft of the first antenna along the fuselage of the aircraft.

In some disclosed examples, the outer mold line of the radome is also configured to satisfy skin thickness requirements and antenna-to-radome gap requirements.

In some examples, an aircraft is disclosed. In some disclosed examples, the aircraft comprises a radome including an outer mold line having a closure angle. In some disclosed examples, the closure angle is configured to reduce a footprint of the radome. In some disclosed examples, the closure angle is also configured to reduce a likelihood of separated airflow from occurring proximate a trailing portion of the radome during a flight of the aircraft. In some disclosed examples, the radome is mounted on a fuselage of the aircraft at a location that reduces a rate of change of a transverse cross-sectional area of the aircraft.

In some disclosed examples, the closure angle is approximately 17 degrees. In some disclosed examples, the flight includes a speed of Mach 0.8.

In some disclosed examples, a longitudinal span of the radome overlaps a leading annular surface of a nacelle of the aircraft. In some disclosed examples, the leading annular surface of the nacelle defines a first transverse plane. In some disclosed examples, a second transverse plane that intersects an apex of the radome is approximately coplanar with the first transverse plane. In some disclosed examples, the radome covers a first antenna and a second antenna. In some disclosed examples, the second antenna is located aft of the first antenna along the fuselage of the aircraft.

In some examples, a method is disclosed. In some disclosed examples, the method comprises configuring a closure angle of an outer mold line of a radome of an aircraft. In some disclosed examples, the closure angle is configured to reduce a footprint of the radome. In some disclosed examples, the closure angle is also configured to reduce a likelihood of separated airflow from occurring proximate a trailing portion of the radome during a flight of the aircraft. In some disclosed examples, the method comprises mounting the radome on a fuselage of the aircraft at a location that reduces a rate of change of a transverse cross-sectional area of the aircraft.

In some disclosed examples, the closure angle is approximately 17 degrees. In some disclosed examples, the flight includes a speed of Mach 0.8.

In some disclosed examples, a longitudinal span of the radome overlaps a leading annular surface of a nacelle of the aircraft when the radome is mounted at the location. In some disclosed examples, the leading annular surface of the nacelle defines a first transverse plane. In some disclosed examples, a second transverse plane that intersects an apex of the radome is approximately coplanar with the first transverse plane when the radome is mounted at the location. In some disclosed examples, the radome is to cover a first antenna and a second antenna when the radome is mounted at the location. In some disclosed examples, the second antenna is located aft of the first antenna along the fuselage of the aircraft.

In some disclosed examples, the method further comprises configuring the outer mold line of the radome to satisfy skin thickness requirements and antenna-to-radome gap requirements.

Although certain example methods, apparatuses and articles of manufacture have been disclosed herein, the scope of coverage of this patent is not limited thereto. On the contrary, this patent covers all methods, apparatuses and articles of manufacture fairly falling within the scope of the claims of this patent.

What is claimed is:

1. An aircraft comprising:
a fuselage;
a first nacelle including a first leading annular surface;
a second nacelle including a second leading annular surface, wherein the second nacelle is located opposite the first nacelle relative to the fuselage, and wherein the first and second leading annular surfaces define a first transverse plane; and
a radome mounted on the fuselage, wherein the radome includes an outer mold line having a closure angle of approximately 17 degrees relative to the fuselage, wherein a longitudinal span of the radome overlaps the first transverse plane, wherein the radome is mounted at a location along the fuselage that optimizes a rate of change of a transverse cross-sectional area of the aircraft proximate the first transverse plane, and wherein a second transverse plane that intersects an apex of the outer mold line is approximately coplanar with the first transverse plane.

2. The aircraft of claim 1, wherein the radome is optimized for a flight that includes a speed of Mach 0.8.

3. The aircraft of claim 1, wherein the radome covers a first antenna and a second antenna, and wherein the second antenna is located aft of the first antenna along the fuselage of the aircraft.

4. The aircraft of claim 3, wherein the outer mold line of the radome is configured to have a minimum antenna-to-radome gap of 0.5 inches relative to the first antenna and the second antenna.

5. The aircraft of claim 1, wherein the closure angle of the outer mold line prevents an attached airflow passing over the longitudinal span of the radome from separating from the fuselage proximate a trailing portion of the radome during a flight of the aircraft.

6. The aircraft of claim 1, wherein the outer mold line of the radome has a minimum skin thickness of 0.222 inches and a maximum skin thickness of 0.285 inches.

7. A method comprising:
configuring a closure angle of an outer mold line of a radome to be approximately 17 degrees relative to a fuselage of an aircraft, wherein the aircraft includes a first nacelle having a first leading annular surface and a second nacelle having a second leading annular surface, and wherein the first and second leading annular surfaces define a first transverse plane; and
mounting the radome on the fuselage at a location along the fuselage, wherein a longitudinal span of the radome overlaps the first transverse plane, wherein a rate of change of a transverse cross-sectional area of the aircraft proximate the first transverse plane is optimized in response to mounting the radome at the location, and wherein a second transverse plane that intersects an apex of the outer mold line is approximately coplanar with the first transverse plane in response to mounting the radome at the location.

8. The method of claim 7, wherein the radome is optimized for a flight that includes a speed of Mach 0.8.

9. The method of claim 7, wherein said mounting the radome comprises covering a first antenna and a second antenna with the radome, and wherein the second antenna is located aft of the first antenna along the fuselage of the aircraft.

10. The method of claim 9, further comprising configuring the outer mold line of the radome to have a minimum antenna-to-radome gap of 0.5 inches relative to the first antenna and the second antenna.

11. The method of claim 7, further comprising configuring the outer mold line of the radome to have a minimum skin thickness of 0.222 inches and a maximum skin thickness of 0.285 inches.

12. An aircraft comprising:
a fuselage;
a first nacelle including a first leading annular surface;
a second nacelle including a second leading annular surface, wherein the second nacelle is located opposite the first nacelle relative to the fuselage, and wherein the first and second leading annular surfaces define a first transverse plane; and
a radome mounted on the fuselage, wherein the radome includes an outer mold line having a closure angle of approximately 17 degrees relative to the fuselage, wherein the outer mold line has an apex, wherein the radome is mounted at a location along the fuselage that optimizes a rate of change of a transverse cross-sectional area of the aircraft proximate the first transverse plane, and wherein a second transverse plane that intersects the apex is approximately coplanar with the first transverse plane.

13. The aircraft of claim 12, wherein the radome is optimized for a flight that includes a speed of Mach 0.8.

14. The aircraft of claim 12, wherein the radome covers a first antenna and a second antenna, and wherein the second antenna is located aft of the first antenna along the fuselage of the aircraft.

15. The aircraft of claim 14, wherein the outer mold line of the radome is configured to have a minimum antenna-to-radome gap of 0.5 inches relative to the first antenna and the second antenna.

16. The aircraft of claim 12, wherein the outer mold line of the radome has a minimum skin thickness of 0.222 inches and a maximum skin thickness of 0.285 inches.

17. The aircraft of claim 12, wherein the closure angle of the outer mold line prevents an attached airflow passing over a longitudinal span of the radome from separating from the fuselage proximate a trailing portion of the radome during a flight of the aircraft.

* * * * *